(12) United States Patent
Lee

(10) Patent No.: US 7,502,621 B2
(45) Date of Patent: Mar. 10, 2009

(54) METHOD FOR RELAY-TRANSMITTING MESSAGES AMONG MOBILE COMMUNICATION TERMINALS

(75) Inventor: Ji-Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 10/849,061

(22) Filed: May 20, 2004

(65) Prior Publication Data

US 2004/0235505 A1 Nov. 25, 2004

(30) Foreign Application Priority Data

May 21, 2003 (KR) ...................... 10-2003-0032333

(51) Int. Cl.
*H04Q 7/20* (2006.01)

(52) U.S. Cl. ...................... 455/466; 455/412.1; 370/349

(58) Field of Classification Search ................ 455/11.1, 455/13.1, 517–519, 526, 466, 550.1, 556.1, 455/556.2, 458, 414.1, 412.2; 709/206, 207; 370/349
See application file for complete search history.

(56) References Cited

U.S. PATENT DOCUMENTS

| | | | | |
|---|---|---|---|---|
| 5,175,634 | A * | 12/1992 | Matsuzaki | 358/407 |
| 5,481,532 | A * | 1/1996 | Hassan et al. | 370/312 |
| 5,485,633 | A | 1/1996 | Burke et al. | 455/51.2 |
| 6,950,413 | B1 * | 9/2005 | Liou | 370/312 |
| 7,103,634 | B1 * | 9/2006 | Ullmann et al. | 709/206 |
| 2002/0057774 | A1 * | 5/2002 | Kim et al. | 379/100.01 |
| 2002/0133609 | A1 * | 9/2002 | Baker | 709/230 |
| 2003/0081557 | A1 * | 5/2003 | Mettala et al. | 370/252 |
| 2003/0100322 | A1 * | 5/2003 | Jeon | 455/466 |
| 2004/0002342 | A1 * | 1/2004 | Goldberg et al. | 455/455 |
| 2004/0019879 | A1 * | 1/2004 | Segawa et al. | 717/124 |
| 2005/0262212 | A1 * | 11/2005 | Arslan et al. | 709/206 |
| 2006/0120367 | A1 * | 6/2006 | Beckmann et al. | 370/390 |

FOREIGN PATENT DOCUMENTS

| | | |
|---|---|---|
| JP | 07-111574 | 4/1995 |
| JP | 11-252654 | 9/1999 |
| JP | 2002-152444 | 5/2002 |
| JP | 2002-298006 | 10/2002 |
| KR | 2001-0110495 | 12/2001 |
| KR | 2002-0037789 | 5/2002 |
| WO | WO01/97539 | 12/2001 |
| WO | WO02/01780 | 1/2002 |

OTHER PUBLICATIONS

Japanese Search Report dated Aug. 17, 2006.

* cited by examiner

*Primary Examiner*—Alexander Eisen
*Assistant Examiner*—Anthony S Addy
(74) *Attorney, Agent, or Firm*—KED & Associates, LLP

(57) ABSTRACT

A method is provided for relay-transmitting a message of a mobile communication terminal. A phone number of a destination terminal may be stored in a destination address field and phone numbers of other remaining destination terminals and a message content are stored in a user data field of a message format, thereby generating a relay transmission message. When a destination terminal receives the relay transmission message, the destination terminal may store a phone number of a first destination terminal stored in the user data field of the message, delete the phone number of the first destination terminal from the user data field, and relay-transmit the message. Accordingly, the message may be transmitted by relaying the message through multiple destination terminals.

22 Claims, 4 Drawing Sheets

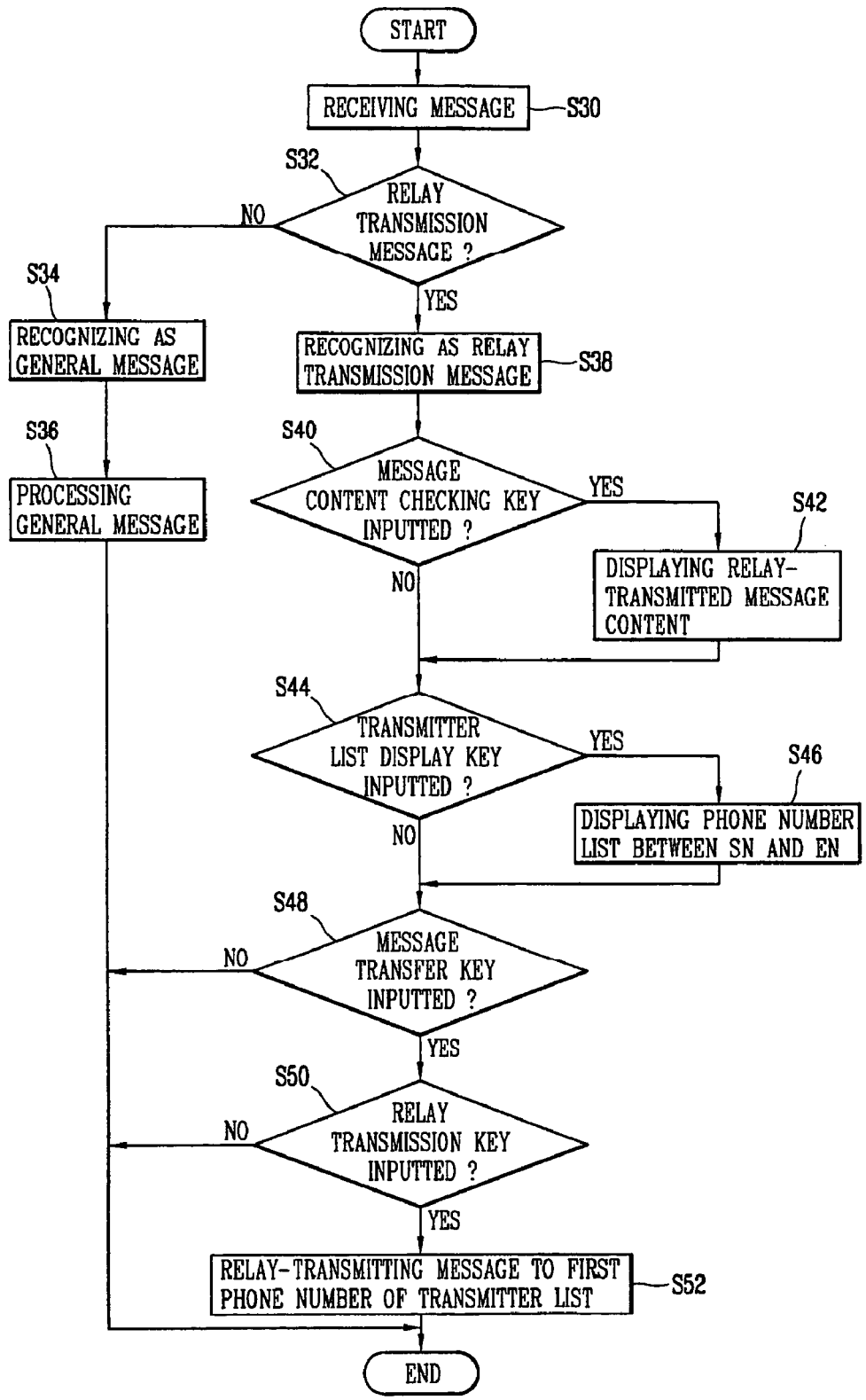

METHOD FOR RELAY-TRANSMITTING MESSAGES AMONG MOBILE COMMUNICATION TERMINALS

The present application claims priority from Korean Patent Application No. 32333/2003 filed May 21, 2003, the subject matter of which is incorporated herein by reference.

BACKGROUND OF THE INVENTION

1. Field of the Invention

Embodiments of the present invention may relate to a method for relay-transmitting a message among mobile communication terminals.

2. Background of Related Art

Multimedia terminals may wirelessly receive and transmit a large amount of image data such as images, graphics as well as voice. The multimedia mobile communication terminal may include various message transmission functions including, e.g., a Short Message Service (SMS), a Long Message Service (LMS), an Enhanced Message Service (EMS), a Multimedia Message Service (MMS) as well as voice communications. The SMS is a service to allow mobile communication subscribers to send and receive short messages. The EMS is a service to allow mobile communication subscribers to send and receive voice files, pixel image files and formatted text files. The MMS is a message service having a function of adding music and a music file, a still image and video image and every animation file of a text file.

When a content for transmission is simple or a voice call communication is not available, a message transfer service may be more convenient than and saves charges as compared to the voice communication service.

One method for transmitting a message to multiple mobile communication terminals is a broadcast transmission method. In a broadcast transmission method, a mobile communication terminal inputs a message to be transmitted, inputs phone numbers of a plurality of terminals to which the message is to be transmitted, and simultaneously transmits the message to each mobile communication terminal. The broadcast transmission is very convenient for users when the same message is to be simultaneously transmitted to a plurality of mobile communication terminals.

However, a sender (i.e., a caller) who transmits the message pays a service usage amount based on the number of message transmissions. Thus, the sender disadvantageously bears a high burden of service charges.

If a message sender is an information provider, even though the information provider provides useful information to receivers, a problem may arise that the sender is charged based on the number of times of providing information. Therefore, a charging processing method for charging a receiver who receives usable information from a message sender is desired so as to avoid such a method where the message sender is charged the service usage amount.

SUMMARY OF THE INVENTION

Embodiments of the present invention may provide a method for relay-transmitting a message of a mobile communication terminal when a message is to be transmitted to multiple users. If one user transmits the message to a different user, then the different user may transmit the message to another different user, thereby transmitting the message by relaying through a plurality of users.

Another embodiment of the present invention may provide a method for relay-transmitting a message of a mobile communication terminal capable of allowing users to share a service usage charge by transmitting a message by relaying through a plurality of users when the message is to be transmitted to the plurality of users.

A method may be provided for relay-transmitting a message of a mobile communication terminal that includes inputting a message content, inputting a plurality of destination phone numbers, selecting relay transmission, and relay-transmitting the message to an arbitrary phone number (or one of the phone numbers) among the destination phone numbers. The arbitrary phone number may be a first inputted destination phone number.

In the message, a user data field may include a start tag and an end tag. The phone numbers may be input between the start tag and the end tag, and the message content may be input following the end tag.

If the destination phone numbers and the message content are not stored in one message format, they may be divided and stored in a plurality of messages. A header of each message may include the overall number of messages and the number of the current message.

The relay transmitting may include storing the arbitrary phone number in a destination address field, storing destination phone numbers other than the arbitrary phone number between the start tag and the end tag of the user data field. The relay transmitting may also include storing the inputted message content after the end tag and transmitting the message with both the destination address field and the user data field filled.

A method may be provided for relay-transmitting a message of a mobile communication terminal that includes receiving a first message, checking whether the first message is a relay-transmitted message and transmitting a second message to one of a plurality of destination terminals if the first message is a relay-transmitted message.

The checking may include checking whether there is a start tag in a user data field of the first message, determining the first message as a relay-transmitted message if there is a start tag in the user data field and determining the first message as a general message if there is no start tag in the user data field.

The transmitting may include storing an arbitrary one of a plurality of phone numbers of destination terminals included in the first message in a destination address field of the second message and storing phone numbers other than the arbitrary one of the phone numbers between the start tag and the end tag of the user data field of the second message. The transmitting may further include storing a message content of the first message after the end tag of the user data field of the second message and transmitting the second message to a destination terminal corresponding to the destination address field.

When the mobile communication terminal receives a command for a relay transmission from a user, the mobile communication terminal may transmit the second message. That is, when the mobile communication terminal recognizes that the first message is a relay-transmitted message, the second message may be automatically generated and relay-transmitted without a user's command for relay transmission.

The method for relay-transmitting a message may further include terminating a relay transmission of the second message when there is a phone number of a destination terminal between the start tag and the end tag of the user data field of the first message.

The method for relay-transmitting a message may further include displaying the message content stored after the end tag of the user data field of the first message when a command for checking the message content is input.

The method for relay-transmitting a message may further include displaying the phone numbers stored between the start tag and the end tag of the user data field of the first message when a command for a transmitter list checking is input.

A message may be provided for a relay-transmission service of a mobile communication terminal that includes a user data field having a start tag indicating a start of destination phone numbers for relay transmission, the destination phone numbers, an end tag for indicating an end of the destination phone numbers, and a message content field stored after the end tag. The message may also include a destination address field.

The user data field may further include an identifier positioned between the start tag and the end tag to identify the destination phone numbers.

The destination phone numbers may be deleted one by one whenever each is relay-transmitted. Additionally, one of the destination phone numbers may be stored in the destination address field whenever it is relay-transmitted.

Additional advantages, objects, features and embodiments of the invention may be set forth in part in the description that follows and in part may become apparent to those having ordinary skill in the art upon examination of the following or may be learned from practice of the invention.

BRIEF DESCRIPTION OF THE DRAWINGS

The following represents brief descriptions of the drawings in which like reference numerals represent like elements and wherein:

FIG. 4 is a flow chart of a method for relay-transmitting a message in accordance with an example embodiment of the present invention.

DETAILED DESCRIPTION OF PREFERRED EMBODIMENTS

A message as described hereinafter may include a voice message, a short message, a long message or a multimedia message, for example.

Figure 1:
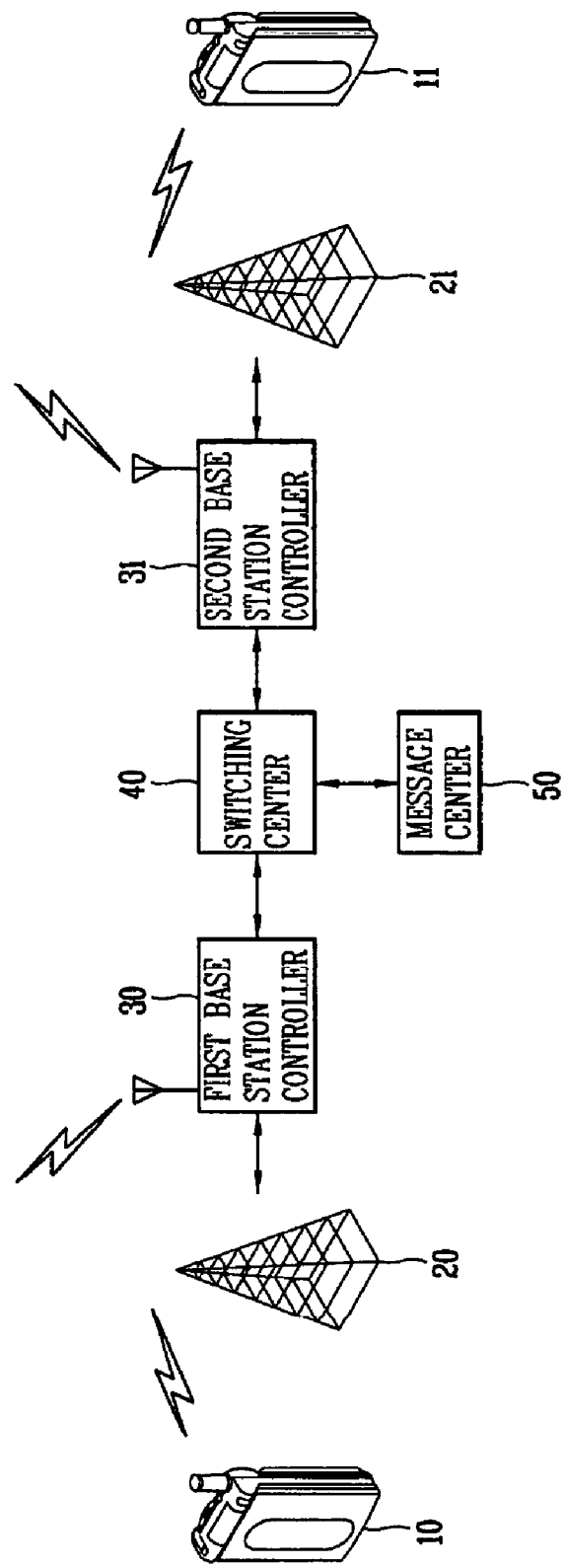
FIG. 1 illustrates an example construction arrangement of a mobile communication system for a message transmission service.

FIG. 1 illustrates an example construction arrangement of a mobile communication system for a message transmission service. Other arrangements are also possible. As shown, a mobile communication system may include mobile communication terminals 10 and 11 for transmitting and receiving a message during a user's traveling, base stations 20 and 21 for wirelessly communicating with the mobile communication terminals 10 and 11, and first and second base station controllers 30 and 31 for controlling the base stations 20 and 21. The mobile communication system may further include a switching center 40 for switching a call transmitted through the first and second base station controllers 30 and 31 and a message center (MC) 50 for providing a message transmission service to the mobile communication terminals 10 and 11.

Operations of the message transmission service of the mobile communication system will now be described.

A message originated from the mobile communication terminal 10 may be transmitted to the MC 50 after passing through the base station 20, the first base station controller 30 and the switching center 40.

The message center 50 may check a position of a destination mobile communication terminal based on a destination phone number included in the originated message. The message center 50 may then process the message according to a state of the destination mobile communication terminal so that the message can be forwarded to the destination mobile communication terminal. That is, if the destination mobile communication terminal is in an available state for an incoming call, the MC 50 may transmit the message to the destination mobile communication terminal through the switching center 40. If, however, the destination mobile communication terminal is in a power-off state or is out of a service area, the MC 50 may store the message and attempt transmission of the message at pre-set times (or arbitrary times).

If the same message is to be transmitted to multiple destination terminals, embodiments of the present invention may relay-transmit a message among multiple destination terminals.

Operations of generating and originating a message for a relay transmission service will now be described.

Figure 2:
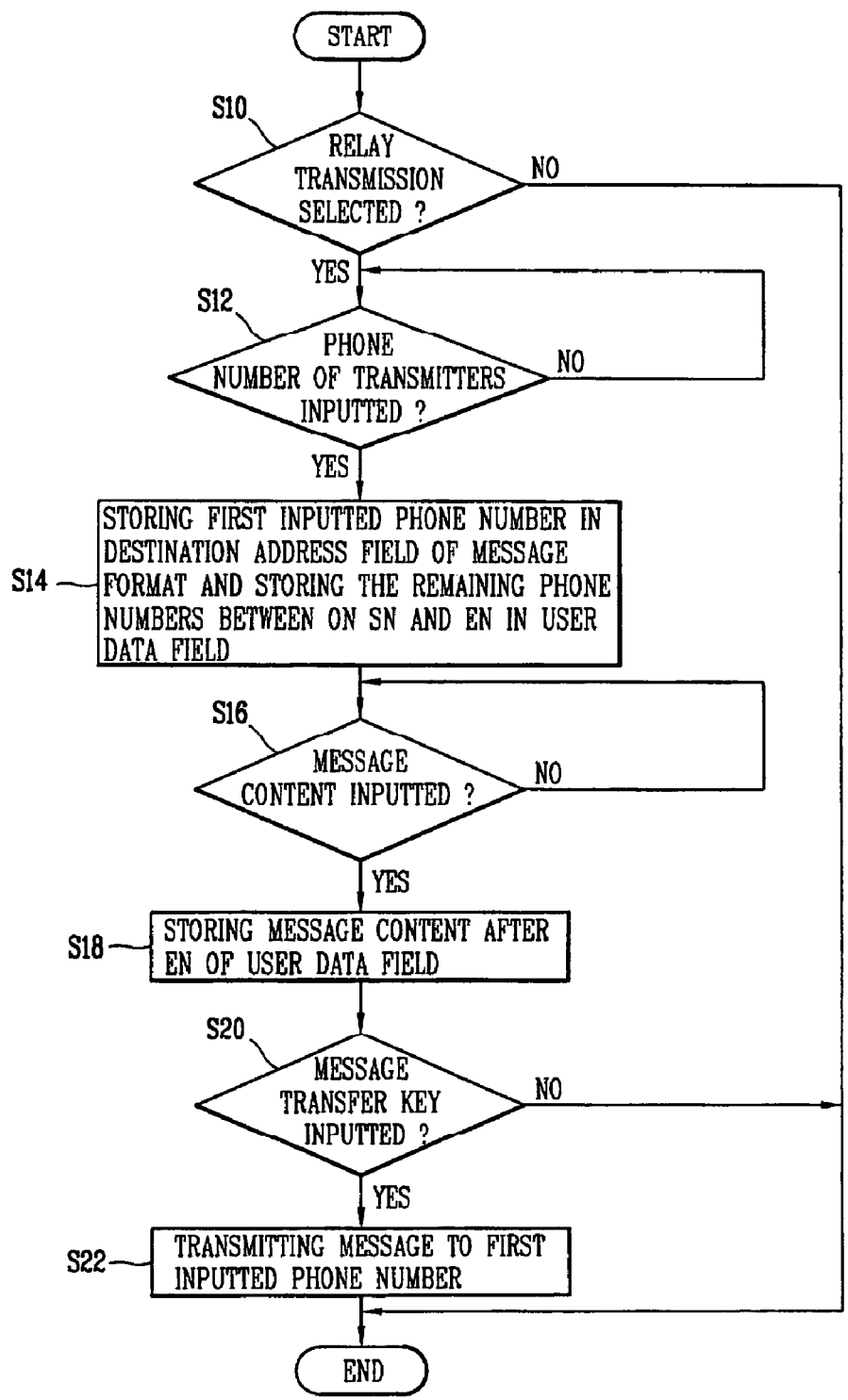
FIG. 2 is a flow chart of a method for generating a message for a message relay transmission service in accordance with an example embodiment of the present invention.

FIG. 2 is a flow chart of a method for generating a message for a message relay transmission service in accordance with an example embodiment of the present invention. Other embodiments, operations and orders of operation are also within the scope of the present invention.

When a message is to be transmitted to multiple destination terminals, an originating terminal may receive a message and phone numbers of multiple destination terminals from a user (i.e., the user of the originating terminal), and then relay-transmit the message to destination terminals corresponding to the inputted phone numbers.

When a message is to be transmitted to multiple destination terminals, a user of the originating terminal may select a broadcast transmission service or a relay transmission service. The selection can be made by inputting the selection via a specific key or a soft key provided in a key pad of the originating terminal.

After the relay transmission service is selected (operation S10), when phone numbers of the destination terminals and a message content are input from the user, the originating terminal may store the input phone numbers and the message content in a user data field of a message format for a message transmission service (operations S12~S18). Although not specifically shown, the order of those operations may be different than the order shown in FIG. 2.

Figure 3:
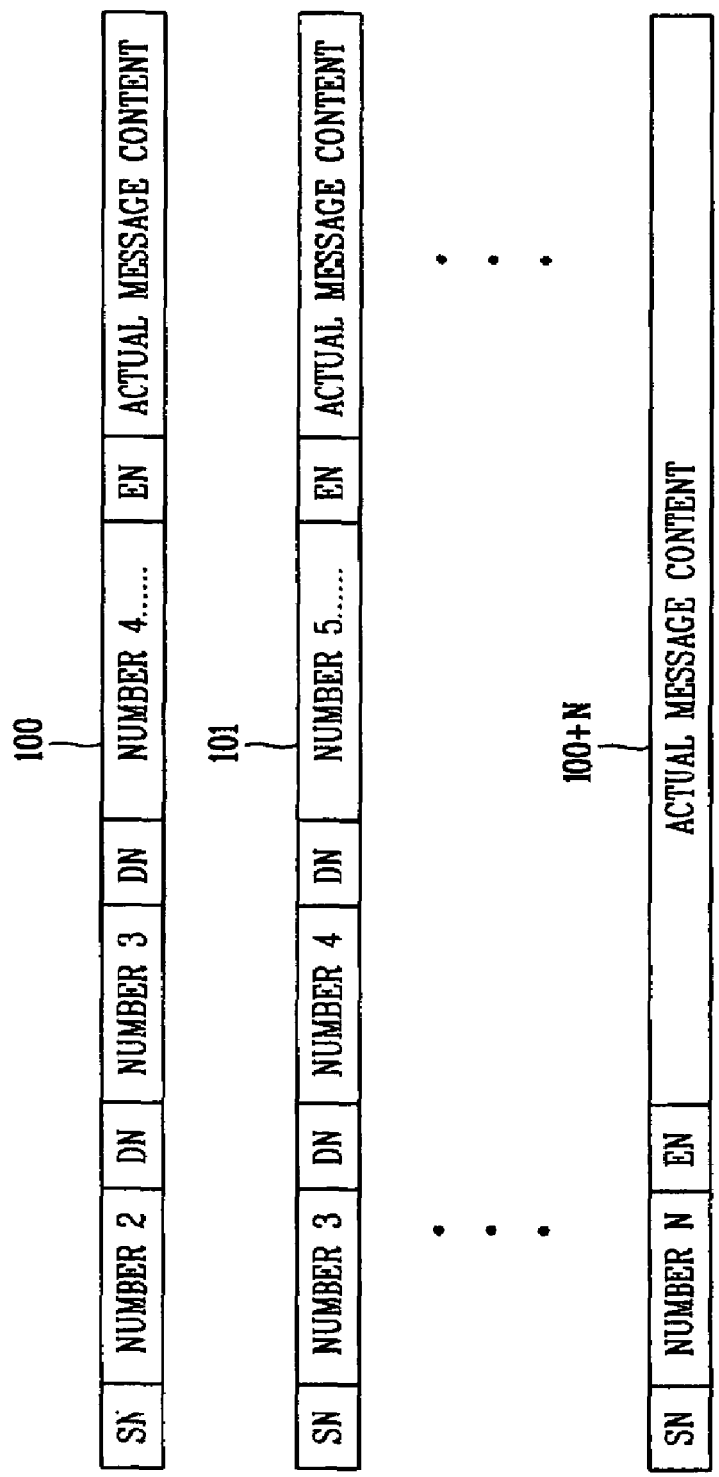
FIG. 3 illustrates a structure of a user data field for a message relay transmission.

FIG. 3 illustrates a structure of a user data field for a message relay transmission. As shown in FIG. 3, a Start Number (SN) is a start tag indicating a start of phone numbers of destination terminals for performing a relay transmission, an End Number (EN) is an end tag indicating the end of the phone numbers (or end of the list of phone numbers), and a Discriminate Number (DN) is an identifier for identifying the phone numbers stored between the SN and the EN.

The originating terminal may store a first inputted phone number of a destination terminal (i.e., a first destination terminal) in a destination address field of the message format and store other remaining phone numbers between the SN and the EN of the user data field (operations S12 and S14). The DN exists between the phone numbers stored between the SN and the EN. If a message is to be relay-transmitted to number 1, number 2, number 3, number 4 and number 5, then number 1 may be stored in the destination address field of the message format, and number 2 to number 5 may be stored between the SN and the EN of the user data field like the user data field 100 of FIG. 3. In addition, the originating terminal may store the inputted message content following the EN of the user data field (operations S16 and S18), thereby completing generation of a message.

When a message transfer command is inputted from the user, the originating terminal may transmit the generated message to the phone number of the destination terminal stored in the destination address field (operations S20 and S22). In case of a multimedia message of the MMS, the message may be relayed using a Wireless Application Protocol (WAP).

Since the originating terminal has transmitted one message to the first inputted destination terminal, the user of the originating terminal is charged for one message transmission service usage.

In case of a SMS message, the length of the user data field may be set to 140 bytes, for example. If there are many phone numbers for the destination terminals (i.e., destination phone numbers) to be stored in the user data field or a message content is long, then the destination phone numbers and the message content may not be stored in one message format. Thus, the remaining destination phone numbers and the message content may be stored in the user data field of a next message. A header of each message may include a maximum number of messages and numbers of the current message.

An operation of a message for a relay transmission service being received by a destination terminal and then transmitted to a different destination terminal will now be described.

FIG. 4 is a flow chart of a method for relay-transmitting a message in accordance with an example embodiment of the present invention. Other embodiments, operations and orders of operation are also within the scope of the present invention.

The destination terminal, which has received a relay-transmitted message, may relay-transmit the message to a next destination terminal. The transmitted message may include phone numbers of the other remaining destination terminals.

When the message is received (operation S30), the first destination terminal checks whether there is a start tag (SN) in the user data field of the received message to confirm whether the received message is a relay-transmitted message (operation S32).

If the received message is not a relay-transmitted message, the first destination terminal may recognize the received message as a general message (i.e., one of VMS, SMS, LMS, EMS and MMS) and process the message according to a general message processing procedure (operations S34 and S36).

However, if the received message is a relay-transmitted message, the first destination terminal may wait for a user's message content acknowledge command. When the message content acknowledge command is inputted from the user, the first destination terminal may display the message content that was recorded following the EN of the user data field of the received message (operations S38, S40 and S42).

When a transmitter list display command is inputted from the user, the first destination terminal may display phone numbers stored between the SN and the EN of the user data field (operations S44 and S46).

If a message transfer stop command is inputted from the user, the first destination terminal may terminate the relay transmission (operation S48).

When a message transfer command is inputted from the user, the first destination terminal may check whether a relay transmission has been selected by the user. If the relay transmission has not been selected, the first destination terminal may terminate message transmission (operation S50).

If the relay transmission has been selected by the user, the first destination terminal may generate a transmission message using the received message and transmit the transmission message to a different destination terminal. That is, the first destination terminal may store a first phone number among phone numbers stored between the SN and the EN of the received message in a destination address field and maintain the remaining phone numbers between the SN and the EN as well as maintain the message content following the EN, thereby generating the transmission message and transmitting the generated transmission message (operation S52).

Upon receiving the message having the user data field 100 (FIG. 3), if the phone number of the first destination terminal is number 1, then the first destination terminal relay-transmits a message having the user field 101 to a second destination terminal corresponding to number 2.

When the message is received by the first destination terminal through relay transmission, then the first destination terminal can automatically relay-transmit the received message to the second destination terminal without a user's command for relay transmission of the message.

In this manner, the first destination terminal may transmit one message to the second destination terminal so the first destination terminal pays one message transmission service usage charge.

Accordingly, in embodiments of the present invention, since the message can be relay-transmitted among multiple destination terminals, the service usage charge can be shared by multiple destination terminals.

The above-described method for relay-transmitting a message of a mobile communication terminal may have the following advantages. For example, the user data field of the message format may include a start tag and an end tag as well as phone numbers of destination terminals stored between the start tag and the end tag so that when a destination terminal receives a message, the destination terminal can recognize the message as a relay-transmitted message and then relay-transmit the message to a different destination terminal.

In addition, when a message is transmitted to multiple destination terminals, the message may be transmitted by relaying the message among multiple destination terminals. Thus, a message transmission service usage charge can be shared by multiple destination terminals.

Moreover, when a message is transmitted to multiple destination terminals, a new message transmission service (i.e., a relay transmission service) can be provided to users.

The foregoing embodiments and advantages are merely exemplary and are not to be construed as limiting the present invention. The present teaching can be readily applied to other types of apparatuses. The description of embodiments of the present invention is intended to be illustrative, and not to limit the scope of the claims. Many alternatives, modifications, and variations will be apparent to those skilled in the art.

What is claimed is:

1. A method for relay-transmitting a message of a mobile communication terminal comprising:
   inputting a message content into a first message;
   inputting a plurality of destination phone numbers into the first message, wherein inputting the message content and inputting the plurality of destination phone numbers are performed at the mobile communication terminal by a user, wherein the first message includes a user data field and a destination address field, the user data field including a start tag, an end tag and a plurality of destination phone numbers between the start tag and the end tag, and the destination address field includes at least one of the plurality of destination phone numbers;

providing the first message from the mobile communication terminal to a first terminal corresponding to a first one of the plurality of destination phone numbers;

transmitting the first message from the first terminal corresponding to the first one of the destination phone numbers to a second terminal corresponding to a second one of the plurality of destination phone numbers;

receiving the first message at the second terminal;

determining that the first message received at the second terminal is a relay-transmitted message by determining that there is a start tag in a user data field of the first message received at the second terminal;

in response to the determination that the first message received at the second terminal is to be relay-transmitted, automatically generating and relay-transmitting a second message without a user's command for relay transmission by transmitting the second message from the second terminal to a third terminal corresponding to a third one of the plurality of destination phone numbers provided within the user data field of the first message;

receiving the second message at the third terminal;

determining that the second message received at the third terminal is a relay-transmitted message by determining that there is a start tag in a user data field of the second message received at the third terminal; and in response to the determination that the second message received at the third terminal is to be relay-transmitted, transmitting a third message from the third terminal to a fourth terminal corresponding to a fourth one of the plurality of destination phone numbers provided within the user data field of the first message.

2. The method of claim 1, further comprising selecting a relay transmission.

3. The method of claim 1, wherein the first one of the destination phone numbers comprises a first inputted destination phone number.

4. The method of claim 1, wherein the destination address field includes the first one of the destination phone numbers, the user data field includes the second one of the destination phone numbers and the phone numbers other than the first one of the destination phone numbers provided between the start tag and the end tag, and the message content is provided after the end tag.

5. The method of claim 1, wherein when the destination phone numbers and the message content are not stored in one message format, the destination phone numbers and the message are divided and stored in a plurality of messages.

6. The method of claim 1, wherein the first message comprises a header, the header including an overall number of messages and a number of the current message.

7. The method of claim 1, wherein selection of relay-transmitting is made using a specific key provided in a key pad of the mobile communication terminal or a soft key on a menu.

8. The method of claim 1, wherein inputting the plurality of destination phone numbers includes:

storing the first one of the destination phone numbers in the destination address field; and storing destination phone numbers including the second one, the third one and the fourth one of the destination phone numbers between the start tag and the end tag of a user data field, wherein inputting the message content includes:

storing the inputted message content after the end tag, and wherein transmitting the first message includes:

transmitting the first message with the destination address field and the user data field.

9. The method of claim 1, wherein the first message comprises a voice message, a short message, a long message, an enhanced message, or a multimedia message.

10. A method for relay-transmitting a message of a mobile communication terminal, comprising:

receiving a first message from the mobile communication terminal at a first mobile communication terminal;

determining that the first message received at the first mobile communication terminal is a relay-transmitted message by determining that there is a start tag in a user data field of the first message received at the first mobile communication terminal;

if the first message is determined by the first mobile communication terminal to be a relay-transmitted message then a second message is automatically generated and relay-transmitted without a user's command for relay transmitting by:

storing one of a plurality of phone numbers of destination terminals included in the first message in a destination address field of a second message, storing a plurality of phone numbers other than one of the phone numbers between a start tag and an end tag of a user data field of the second message, storing a message content of the first message after the end tag of the user data field of the second message, and transmitting the second message from the first mobile communication terminal to the one of the destination terminals corresponding to the destination address field of the second message;

receiving the second message at a second mobile communication terminal;

determining that the second message received at the second mobile communication terminal is a relay-transmitted message by recognizing a start tag in the second message received at the second mobile communication terminal;

if the second message received at the second mobile communication terminal is determined by the second mobile communication terminal to be a relay-transmitted message based on the recognized start tag, then:

storing one of a plurality of phone numbers of destination terminals included in the user data field of the second message in a destination address field of a third message, and transmitting the third message from the second mobile communication terminal to the one of the destination terminals in the destination address field of the third message;

receiving the third message at a third mobile communication terminal;

determining that the third message received at the third mobile communication terminal is a relay-transmitted message by recognizing a start tag in the third message received at the third mobile communication terminal; and when the third message received at the third mobile communication terminal is determined by the third mobile communication terminal to be a relay-transmitted message based on the recognized start tag. then transmitting a fourth message from the third mobile communication terminal to a fourth mobile communication terminal.

11. The method of claim 10, wherein the determining whether the first message received at the first mobile communication terminal is a relay-transmitted message comprises:

determining whether there is a start tag in a user data field of the first message received at the first mobile communication terminal; and determining the first message received at the first mobile communication terminal is a general message if there is no start tag in the user data field.

12. The method of claim 10, wherein the first message and the second message each include the start tag and the end tag in the user data field as well as phone numbers of multiple destination terminals between the start tag and the end tag, and the message content is provided after the end tag.

13. The method of claim 12, wherein a separate discriminator exists between each of the phone numbers.

14. The method of claim 12, wherein one of the phone numbers comprises a first phone number of the plurality of destination terminals.

15. The method of claim 10, wherein the second message is transmitted when a command for a relay transmission is input from a user.

16. The method of claim 10, further comprising:
terminating transmission of the second message if a phone number of a destination terminal does not exist between the start tag and the end tag of the user data field of the first message.

17. The method of claim 10, further comprising:
displaying a message content stored after an end tag of a user data field of the first message if a command for checking the message content is inputted.

18. The method of claim 10, further comprising:
displaying phone numbers stored between a start tag and an end tag of a user data field of the first message when a command for a transmitter list checking is inputted.

19. The method of claim 10, wherein the first message comprises a voice message, a short message, a long message, an enhanced message or a multimedia message.

20. A method for relay-transmitting a message of a mobile communication terminal, comprising:
receiving a first message from the mobile communication terminal at a first mobile communication terminal;
determining that the first message received at a first mobile communication terminal is a message to be relay-transmitted to at least two additional mobile communication terminals by determining that the first message received at the first mobile communication terminal includes a start tag in a user data field;
transmitting a second message from the first mobile communication terminal when the first message is determined to be a message to be relay-transmitted to at least two additional mobile communication terminals based on presence of the start tag in the user data field of the first message, wherein the second message is automatically generated and relay-transmitted without a user's command for relay transmission when the first message is determined to be relay-transmitted, and wherein transmitting the second message comprises:
storing a phone number in a destination address field of the second message,
storing other phone numbers between a start tag and an end tag of a user data field of the second message, the user data field being different than the destination address field, and
transmitting the second message to a destination terminal corresponding to the phone number stored in the destination address field of the second message;
determining that the second message received at a second mobile communication terminal is a message to be relay-transmitted to at least another mobile communication terminal by determining that the second message received at the second mobile communication terminal includes a start tag in a user data field of the second message;
transmitting a third message from the second mobile communication terminal to a third mobile communication terminal when the second message is determined to be a message to be relay-transmitted to at least another mobile communication terminal based on presence of the start tag in the user data field of the second message;
determining that the third message received at the third mobile communication terminal is a message to be further relay-transmitted by determining that the third message received at the third mobile communication terminal includes a start tag in a user data field of the third message; and
transmitting a fourth message from the third mobile communication terminal to a fourth mobile communication terminal when the third message is determined by the third mobile communication terminal to be further relay-transmitted based on the presence of the start tag in the user data field of the third message.

21. The method of claim 20, wherein transmitting the third message comprises:
storing a phone number of a third mobile communication terminal in a destination field of the third message; and
storing other phone numbers in a user data field of the third message.

22. The method of claim 21, wherein storing the other phone numbers includes storing other phone numbers between a start tag and an end tag of the user data field of the third message.

* * * * *